Dec. 9, 1952 W. F. KING 2,621,086
HYDROSTATICALLY LUBRICATED SPHERICAL BEARING
Filed Sept. 15, 1950
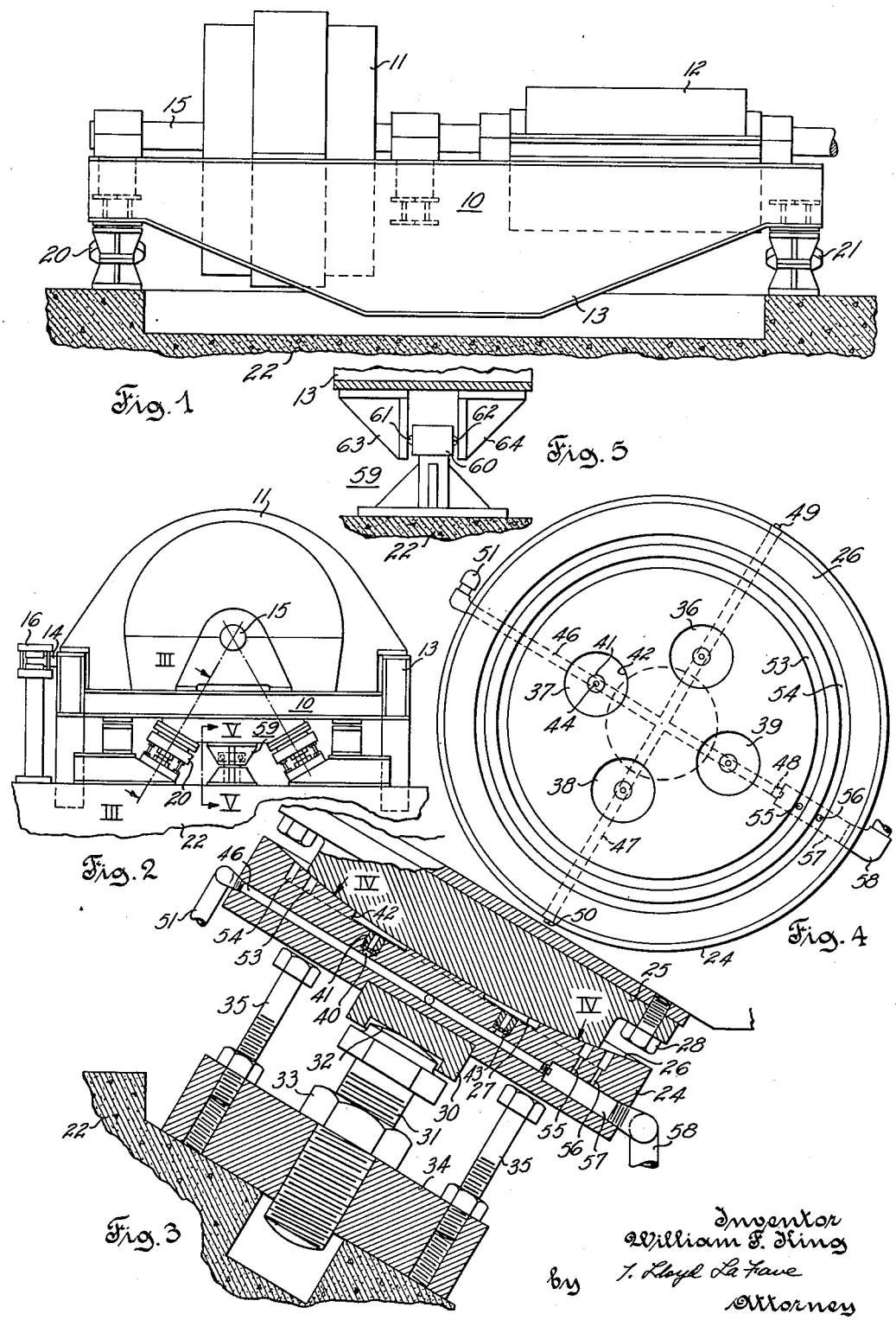
Inventor
William F. King
by T. Lloyd LaFave
Attorney Patented Dec. 9, 1952

2,621,086

UNITED STATES PATENT OFFICE 2,621,086

HYDROSTATICALLY LUBRICATED SPHERICAL BEARING

William F. King, Milwaukee, Wis., assignor to Allis-Chalmers Manufacturing Company, Milwaukee, Wis.

Application September 15, 1950, Serial No. 185,105

6 Claims. (Cl. 308—9)

This invention relates to spherical bearings and more particularly to hydrostatically lubricated spherical bearings.

In machines exerting great pressure on bearing surfaces and especially such machines which subject the bearings to only intermittent sliding or turning motion, the oil film in the bearings is in danger of breaking down, and if that happens, relatively severe wear of the bearings is to be expected. It is desirable therefore to provide a bearing for such machines wherein an oil film is maintained between the contacting surfaces even though the relative motion of the bearing surfaces is slow and frequently absent.

It is therefore an object of the invention to provide a spherical bearing which is hydrostatically lubricated.

Another object of the invention is to provide hydrostatic lubrication of a spherical bearing in which the movable member is subject to relatively slow rotational movement.

Another object of the invention is to provide hydrostatic lubrication of a spherical bearing in which the movable member is subject to intermittent limited movement.

Another object of the invention is to provide a hydrostatically lubricated spherical bearing with means for trapping the used oil therefrom.

Other objects and advantages will be apparent from a reading of the following description taken with the accompanying drawing, in which:

Fig. 1 is a view in elevation of a dynamometer supported on spherical bearings embodying the present invention;

Fig. 2 is an end view of the dynamometer of Fig. 1, showing an axial thrust bearing therefor;

Fig. 3 is an enlarged sectional view taken along the line III—III of a bearing shown in Fig. 2;

Fig. 4 is a plan view of the stationary member of the spherical bearing taken along line IV—IV of Fig. 3; and Fig. 5 is an enlarged view in elevation of the axial thrust bearing taken along line V—V of Fig. 2.

Referring more particularly to the drawing, numeral 10 designates a cradle type dynamometer comprising a dynamoelectric machine 11 coupled with a speed changing gear 12 both supported in a cradle type frame 13 from which the dynamometer torque may be measured by the leverage action of an arm 14 acting on any suitable torque measuring mechanism such as the scale 16.

The frame 13 is supported at each end on a pair of radially disposed bearings 20, 21, which embody the present invention, and which are mounted on a suitable foundation 22. Each of the bearings comprises a lower member 24 and an upper member 25. While, in general, either of the members may be stationary, in this embodiment, members 24, 25 are respectively the stationary member and the movable mating member, which have spherically shaped bearing surfaces 26, 27. Either of these surfaces 26, 27 may generally be the concave surface but to properly support frame 13 it is necessary to make surfaces 26 and 27 respectively concave and convex with radii of curvature which lie in axis of the dynamometer shaft 15.

The bearing member 25 is secured by bolts 28 to the frame 13. The stationary member 24 has a cup shaped block 30 secured to its rear face, which block rests on the hardened spherical surface 32 of a jack screw 31. The jack screw is threaded into a base 34 and locked in position by a nut 33. The base is secured in any suitable manner to the foundation 22. The base 34 has four adjustable bolts 35 which act as stops to limit the tilt of the stationary member a predetermined amount in the radial direction with respect to the dynamometer during erection of the dynamometer.

Either one of the members 24 or 25 may have means therein to supply oil to the bearing surfaces, but preferably such means are located in the stationary member and comprise a plurality of pockets or wells 36 to 39 which open in the concave bearing surface 26. The wells are uniformly spaced about the center of the bearing member. Each well consists of coaxially aligned bores 40 to 42, bore 42 from the oil pocket opening in the bearing surface. A washer 43 is disposed in bore 41 against the shoulder formed by the juncture with smaller bore 40. The washer 43 may be secured against the shoulder by any suitable means such as by welding. The washer 43 has a predetermined size of opening 44 to form a restricted orifice for the passage of oil therethrough.

Means connecting the wells 36 to 39 to a source of oil comprise ducts 46, 47. Duct 46 is formed by a hole drilled through the stationary member to intersect the bores 40 of wells 37, 39. One end of duct 46 is closed by a plug 48. Duct 47 is likewise formed by a hole drilled through the stationary member to intersect the bores 40 of wells 36, 38 and to intersect the duct 46. The ends of duct 47 are closed by plugs 49, 50. Duct 46 is connected to flexible tubing 51 which is supplied with oil under pressure from a suitable source such as a constant flow pump, not shown.

A circular groove 53 is provided in the outer portion of one of the bearing surfaces for trapping oil flowing outward under pressure from between the bearing surfaces 26, 27. Groove 53 is preferably situated in the outer portion of surface 26 which is normally in contact with the surface 27 of movable member 25 and is thus closed by surface 27. Another circular groove 54 concentric with groove 53 is provided in the outer portion of concave surface 26 for trapping oil that may be carried beyond groove 53 by capillary action between the bearing surfaces. Groove 54 is open and situated in the outer portion of surface 26 which normally extends beyond the bearing surface 27.

Means for removing the oil trapped in grooves 53, 54 comprise drilled holes 55, 56 which connect grooves 53, 54, respectively, with an intersecting hole 57 drilled into the side of the stationary member. Flexible tubing 58 secured in the hole 57 conducts the escaping oil away to a suitable reservoir, not shown, from which it may be recirculated in the system. In order that the oil may flow in the grooves by the force of gravity toward the pipe 58, the stationary member 24 is positioned so that the pipe 58 is on the lower side thereof, as shown in Fig. 3.

In operation of the dynamometer, variations in the torque on the gear shaft cause the cradle to rotate accordingly. Such movement of the cradle may be intermittent or slowly oscillating. In order that the bearings support the dynamometer for substantially friction free movement, oil under pressure is supplied to the bearings. The oil enters the wells 36 to 39 through ducts 46, 47 from pipe 51. The pressure of the oil in the wells is sufficient to maintain a film of oil between the surface 27 of the movable member and the surface 26 of the stationary member to effectively float the cradle on a bed of oil.

Oil forced to the periphery of the bearing by extrusion or by the sliding action of the bearing members is caught by the grooves 53, 54 and drained therefrom by pipe 58.

The arrangement of the wells 36 to 39, each supplied with oil through their respective orifices 40, assures self-centering of the stationary member 24 with movable member 25. If offsetting of the stationary member with respect to the movable member tends to occur away from any point, or for any defect in a bearing surface, flow of the oil is restrained at that point by the orifice of the adjacent well so that the pressure in the other wells is maintained and metal to metal contact of the bearing members is prevented.

An axial shift of the dynamometer is prevented by the provision of any suitable thrust bearing, such as the thrust bearing 59 shown in Figs. 2 and 5. This thrust bearing comprises a ball bearing raceway 60 rigidly supported on the foundation 22 between the spherical bearings 20 which support one end of the dynamometer. Balls 61, 62 on opposite sides of the raceway may engage one or the other of axially spaced plates 63, 64, which are rigidly secured to the cradle frame 13, to limit the axial movement of the dynamometer to a predetermined amount. With rotation of the dynamometer the plates 63, 64 move in an arc therewith in contact with the balls 61, 62, which reduce to a minimum the friction opposing the rotational movement.

Although but one embodiment of the invention has been illustrated and described it will be apparent to those skilled in the art that various changes and modifications may be made therein without departing from the spirit of the invention or from the scope of the appended claims.

It is claimed and desired to secure by Letters Patent:

1. A bearing comprising a lower stationary member, an upper movable member, said members having spherical engaging bearing surfaces whereby said stationary member supports said movable member, the central portion of one of said members defining a plurality of spaced wells, the outer portion of said lower member defining a plurality of circumferential grooves which interrupt its bearing surface, a source of oil under pressure, means connecting said source to said wells to support said movable member on a film of oil between said surfaces, said oil flowing outwardly between said surfaces to said grooves, one of said grooves being closed by the bearing surface of said upper member for trapping oil forced outward under pressure between said bearing surfaces, another said groove being open and disposed outside of said upper member for trapping oil overflowing from said bearing surfaces by capillary action, and means for removing said oil from said grooves.

2. A bearing comprising a stationary member having a concave spherical bearing surface and a movable member having a convex spherical bearing surface, said stationary member having a well in the central portion of said concave surface and a pair of grooves surrounding said well in the outer portion of said concave surface, a source of oil under pressure, means connecting said source to said well to cause oil from said well to flow outward between said bearing surfaces to said grooves so that a film of oil separates said surfaces, one of said grooves being closed by said convex bearing surface for trapping oil forced outward between said bearing surfaces, the other of said grooves surrounding said convex bearing surface and being open for trapping oil overflowing from said bearing surfaces by capillary action, and means connected to said grooves for removing the oil that has passed through said bearing.

3. A bearing comprising stationary and movable members, said members having spherical engaging bearing surfaces whereby said stationary member supports said movable member, the central portion of one of said bearing surfaces being provided with a well, a source of oil under pressure, means connecting said source to said well to cause oil to flow outward between said bearing surfaces and form a film of oil between said bearing surfaces, the outer portion of one of said members defining a groove surrounding said well mediate the bearing surface of said one of said members and closed by the bearing surface of the other of said members for trapping oil forced outward under pressure between said bearing surfaces, said stationary member defining another groove surrounding the bearing surface of said movable member and open for trapping oil overflowing from said bearing surfaces by capillary action, and means for removing said oil from said grooves.

4. A bearing comprising a lower member, an upper member, said members being relatively movable and having spherical engaging bearing surfaces whereby said lower member supports said upper member, the central portion of one of said bearing surfaces being provided with a plurality of wells, a source of oil under pressure, means connecting said source to said wells to cause oil to flow outward between said bearing surfaces and form a film of oil between said bearing surfaces for supporting said upper member, the outer portion of one of said members defining a groove surrounding said wells mediate the bearing surface of said one of said members and closed by the bearing surface of the other of said members for trapping oil forced outward under pressure between said bearing surfaces, said lower member defining another groove surrounding the bearing surface of said upper member and open for trapping oil overflowing from said bearing surfaces by capillary action, and means for removing said oil from said grooves.

5. A bearing comprising stationary and movable members, said members having spherical engaging bearing surfaces whereby said stationary member supports said movable member, the central portion of one of said bearing surfaces being interrupted by a plurality of wells, said wells being closed by the other of said bearing surfaces, a source of oil under pressure, means connecting said wells with said source for supplying oil under a predetermined pressure to said wells to produce a film of oil between said spherical surfaces for supporting said movable member, each of said wells having a constriction to limit the flow of oil therethrough to maintain said predetermined pressure in said connecting means when any of said wells is imperfectly closed by said movable member, the outer portion of one of said members defining a groove surrounding said wells mediate the bearing surface of said one of said members and closed by the bearing surface of the other of said members for trapping oil forced outward under pressure between said bearing surfaces, said stationary member defining another groove surrounding the bearing surface of said movable member and open for trapping oil overflowing from said bearing surfaces by capillary action, and means for removing said oil from said grooves.

6. A bearing comprising stationary and movable members, said members having spherical engaging bearing surfaces whereby said stationary member supports said movable member, the central portion of one of said members defining a plurality of wells interrupting its bearing surface, a source of oil under pressure, means connecting said wells with said source for supplying oil under a predetermined pressure to said wells to produce a film of oil between said spherical surfaces for supporting said movable member, each of said wells having a washer secured therein having a relatively small orifice which restricts the flow of oil therethrough to maintain said predetermined pressure on the oil in all of said wells, the outer portion of one of said members defining a groove surrounding said wells mediate the bearing surface of said one of said members, said groove being closed by the bearing surface of the other said members for trapping oil forced outward under pressure between said bearing surfaces, and means for removing said oil from said groove.

WILLIAM F. KING

REFERENCES CITED

The following references are of record in the file of this patent:

UNITED STATES PATENTS

| Number | Name | Date |
| --- | --- | --- |
| 1,629,577 | Klahn | May 24, 1927 |
| 1,906,715 | Penick | May 2, 1933 |
| 2,053,202 | Palmgren | Sept. 1, 1936 |
| 2,086,896 | Carter | July 13, 1937 |
| 2,440,919 | Shaw | May 4, 1948 |